United States Patent
Levinsky et al.

(10) Patent No.: US 8,595,464 B2
(45) Date of Patent: Nov. 26, 2013

(54) DYNAMIC SIZING OF TRANSLATION LOOKASIDE BUFFER FOR POWER REDUCTION

(75) Inventors: Gideon N. Levinsky, Cedar Park, TX (US); Manish K. Shah, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 13/183,164

(22) Filed: Jul. 14, 2011

(65) Prior Publication Data
US 2013/0019080 A1   Jan. 17, 2013

(51) Int. Cl.
*G06F 12/10*   (2006.01)

(52) U.S. Cl.
USPC .................................. 711/207; 711/E12.061

(58) Field of Classification Search
USPC ........................ 711/207, E12.014, E12.064
See application file for complete search history.

(56) References Cited

U.S. PATENT DOCUMENTS

| | | | |
|---|---|---|---|
| 5,317,705 A | 5/1994 | Gannon et al. | |
| 5,428,757 A | 6/1995 | Sutton | |
| 5,437,017 A | 7/1995 | Moore et al. | |
| 5,487,162 A | 1/1996 | Tanaka et al. | |
| 5,497,780 A | 3/1996 | Zehender | |
| 5,906,001 A | 5/1999 | Wu et al. | |
| 5,960,463 A | 9/1999 | Sharma et al. | |
| 6,119,204 A | 9/2000 | Chang et al. | |
| 6,560,664 B1 | 5/2003 | Carlson | |
| 6,594,750 B1 * | 7/2003 | Campbell | 711/207 |
| 6,633,967 B1 | 10/2003 | Duncan | |
| 2003/0126371 A1 | 7/2003 | Venkatraman | |
| 2004/0103248 A1 | 5/2004 | Hass et al. | |
| 2004/0184340 A1 * | 9/2004 | Dwarkadas et al. | 365/230.03 |
| 2006/0075192 A1 * | 4/2006 | Golden et al. | 711/118 |
| 2008/0155200 A1 * | 6/2008 | Conway | 711/146 |
| 2008/0244181 A1 * | 10/2008 | Walz et al. | 711/121 |
| 2009/0119477 A1 * | 5/2009 | Plondke et al. | 711/207 |

OTHER PUBLICATIONS

Office Action from U.S. Appl. No. 11/222,577, mailed Aug. 22, 2007.

* cited by examiner

*Primary Examiner* — Hal Schnee
(74) *Attorney, Agent, or Firm* — Rory D. Rankin; Meyertons, Hood, Kivlin, Kowert & Goetzel, P.C.

(57) ABSTRACT

Methods and mechanisms for operating a translation lookaside buffer (TLB). A translation lookaside buffer (TLB) includes a plurality of segments, each segment including one or more entries. A control unit is coupled to the TLB. The control unit is configured to determine utilization of segments, and dynamically disable segments in response to determining that segments are under-utilized. The control unit is also configured to dynamically enable segments responsive to determining a given number of segments are over-utilized.

18 Claims, 8 Drawing Sheets

DYNAMIC SIZING OF TRANSLATION LOOKASIDE BUFFER FOR POWER REDUCTION

BACKGROUND

1. Field of the Invention

This invention is related to data storage buffers and more particularly to dynamic resizing of a buffer to reduce power consumption.

2. Description of the Related Art

Processors and computer systems that include the processors typically implement a virtual memory system, in which most software executing on the processors and accessing memory do so using virtual addresses. These addresses are translated through the virtual memory system to addresses (e.g., physical addresses) which are then used to access memory. Virtual memory systems offer several benefits, including: allowing software to address a larger memory space than an actual physical memory included in the system; allowing multiple independent processes to access memory while being protected from interfering with each other (e.g. by one process modifying data used by another process); etc.

Generally speaking, the virtual memory system (and particularly the mapping of virtual addresses to physical addresses) is under software control. Software builds data structures in memory that describe the virtual to physical mappings. These data structures are usually referred to as "page tables", since many translations translate a page of the virtual address space to a page of physical memory, aligned to a page boundary in the physical memory space. Page sizes vary, from 4 kilobytes to several megabytes or even larger. A given virtual memory system often supports more than one page size.

Performing a translation frequently requires several accesses to the page tables in memory. Even if the page tables are cached, the process of searching the page table entries is a relatively lengthy process, as compared to the amount of time needed to execute a given instruction. This added latency on memory accesses (both instruction fetches and load/store operations) to perform the translation process may in turn reduce performance. Accordingly, most processors implement a cache for a subset of the translations from the page tables to speed the translation process. This cache of translations is often referred to as a translation lookaside buffer (TLB). The TLB caches the results of the translation process and typically includes an identification of the virtual address and the corresponding physical address, as well as any protection data that may be included in the virtual memory system (again, generally under the control of software). The data cached in the TLB which is used to translate a given range of virtual addresses (e.g. a page) is referred to as a "translation" for the range/page. The translation may include contents derived from multiple page table entries or one page table entry, depending on the particular virtual memory system.

TLBs typically comprise a Content Addressable Memory (CAM) and a Random Access Memory (RAM). A virtual address may be stored in an entry in the CAM, and the corresponding physical address (as well as any protection data) in a corresponding entry in the RAM. To translate a given virtual address, a portion of the virtual address corresponding to a page is compared to entries in the CAM. If a match is found, the translation data is read from the corresponding entry. When a page is not matched in the TLB (a TLB miss), the lengthy process of searching the page table entries may be performed and performance is decreased. Therefore, the TLB typically includes a large number of entries to prevent such misses. While a larger TLB may reduce the number of misses, including a larger TLB in a processor may also result in higher power consumption—due to both the large number of entries and the need to compare a relatively large number of bits (often 50-60) for each entry. While the structure of the TLB can be modified to decrease power consumption by decreasing the size of the TLB, changing the associativity of the TLB, or changing the page size, such modifications may also result in loss of performance (more TLB misses). Additionally, in a multithreaded processor, the TLB may be larger (consuming more power) in order to accommodate the multiple threads which may share the TLB. However, when only one thread is active, many of the entries in the TLB will not be used which may lead to unnecessary power consumption.

SUMMARY

In one embodiment, a processor including a translation lookaside buffer (TLB) is contemplated. In various embodiments, the TLB includes a plurality of segments and a plurality of entries, with each segment including one or more of the entries. A control unit coupled to the TLB is configured to determine the utilization of segments, and dynamically disable segments in response to detecting various conditions. In one embodiment, a TLB segment may be disabled responsive to determining the segment is under-utilized. The control unit may also be configured to dynamically enable segments when a given number of segments are over-utilized or some other condition is detected.

In further embodiments, a segment of a TLB may be considered over-utilized when the number of active entries in the segment meets a given threshold. Detecting a particular segment of a TLB is under-utilized may include detecting a number of active entries of the particular segment is below a given threshold. Thresholds for detecting over-utilization and under-utilization may be different or may be the same in various embodiments. In various embodiments, determining the utilization of segments and enabling/disabling segments may be performed periodically, in response to an event or condition such as a TLB miss, or otherwise.

In some embodiments, access bits corresponding to each entry and/or each segment may be used to track utilization. For example, entry access bits may be set to indicate active entries. Segment access bits may be set or cleared based on entry access bits of entries in the segment. In various embodiments, utilization of a segment may be determined based on a combination of the segment's entry access bits and segment access bits.

These and other embodiments are contemplated and will be appreciated in view of the following description and drawings.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
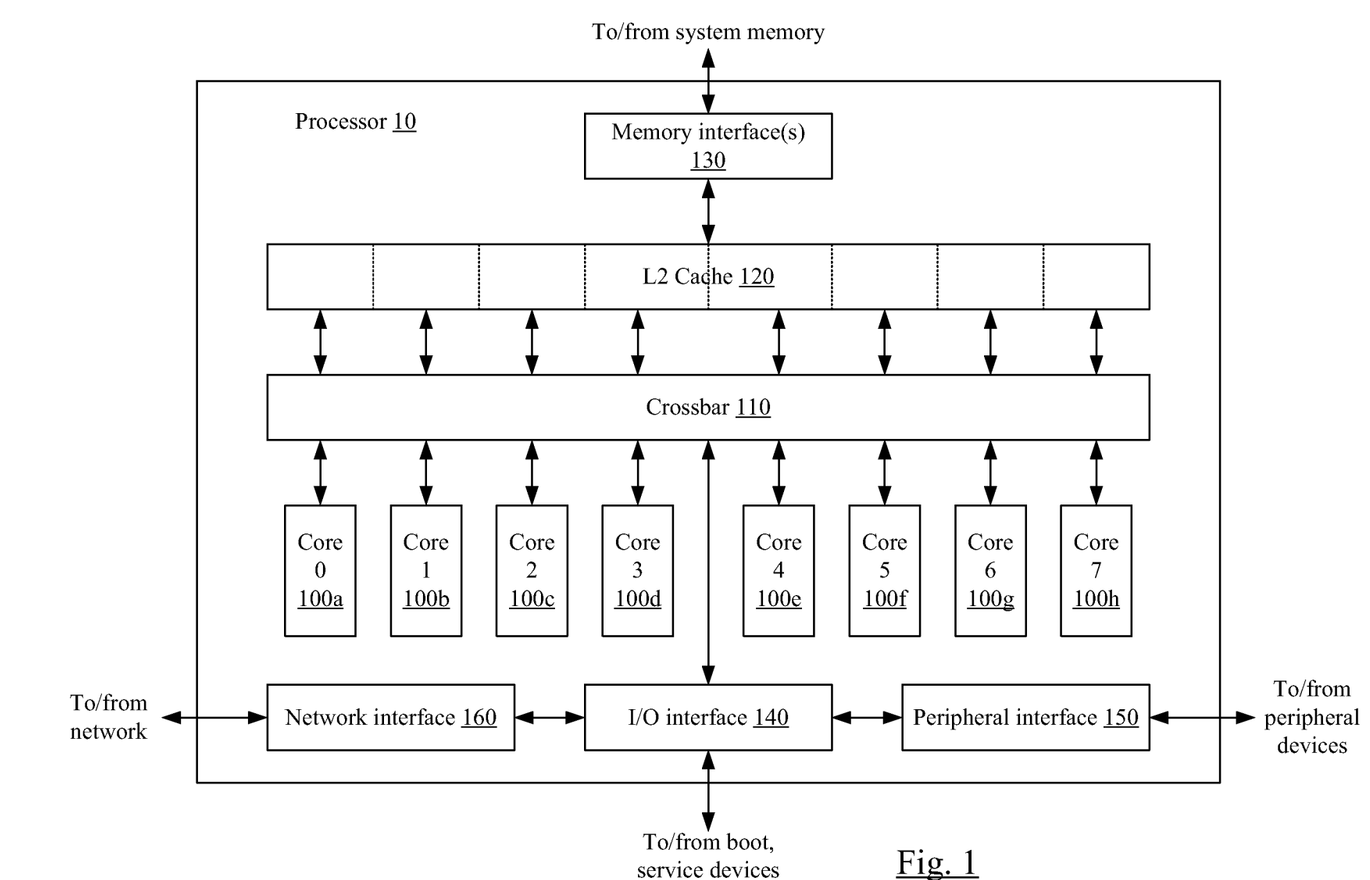
FIG. 1 is a block diagram of one embodiment of a processor.
Figure 2:
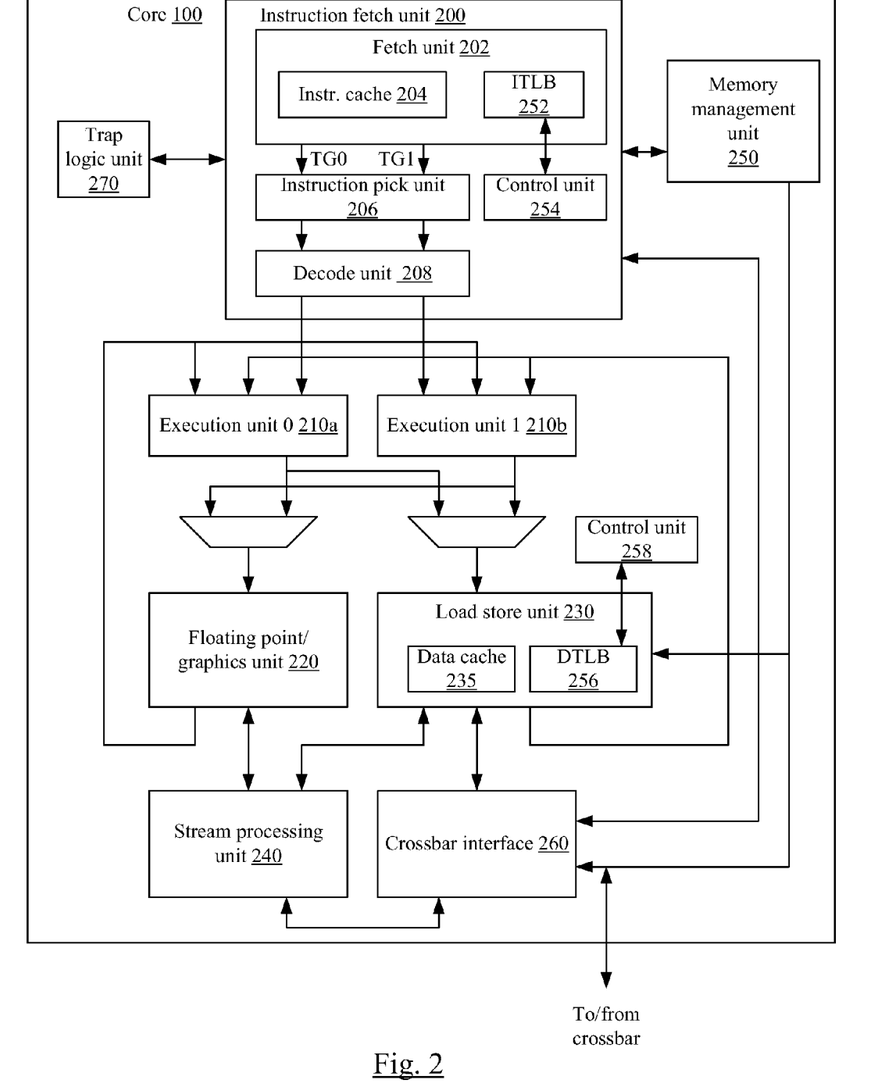
FIG. 2 is a block diagram of one embodiment of a core shown in FIG. 1.

FIGS. 1-2 present an overview of one embodiment of a multithreaded processor 10 that may implement a dynamic TLB sizing as described in more detail below. In other embodiments, the processor may implement other configurations, as desired.

In the embodiment of FIG. 1, processor 10 includes a plurality of processor cores 100a-100h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). As used herein, multiple reference numerals followed by a letter (e.g., cores 100a-100h) may be collectively referred to by the reference numeral alone (e.g., cores 100).

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

One embodiment of core 100 is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. Fetch unit 202 may implement logic to handle instruction cache misses and translation of virtual instruction fetch addresses to physical addresses (e.g., fetch unit 202 may include an Instruction Translation Lookaside Buffer (ITLB) 252).

Load store unit 230 may be configured to process data memory references, such as integer and floating-point load and store instructions as well as memory requests that may originate from stream processing unit 240. LSU 230 may include a data cache 235 as well as logic configured to detect cache misses and to responsively request data from L2 cache 120 via crossbar interface 260. In some embodiments LSU 230 may include logic configured to translate virtual data addresses generated by EXUs 210 to physical addresses, such as a Data Translation Lookaside Buffer (DTLB).

Instruction and data memory accesses may involve translating virtual addresses to other (e.g., physical) addresses for accessing memory. In one embodiment, such translation may occur on a page level of granularity, where a certain number of address bits comprise an offset into a given page of addresses, and the remaining address bits comprise a page number. For example, in an embodiment which uses 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translations may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

If the ITLB 252 detects (or indicates) a miss for a translation request (for a fetch in the instruction cache 204), the IFU 200 may transmit a TLB reload request to the MMU 250. The MMU 250 may initiate a table walk responsive to the request. The MMU may be programmed with the base address of the page tables, and may be designed to search the page tables for a translation according to the definition of the page tables and the defined algorithm for accessing them for a given virtual address in the virtual memory system. For example, a portion of the virtual address may be used, sometimes in combination with a predefined hash function, as an index into the page tables. If a translation is successfully located in the page tables, the MMU 250 may return the translation for storage in the ITLB 252. If no translation is found, the MMU 250 may signal a hardware table walk (HWTW) miss. The MMU 250 may signal the HWTW miss directly to the TLU 270 for handling. Alternatively, the MMU 250 may signal the HW TW miss to the IFU 200. If an instruction is to issue from the virtual page for which no translation was located, a page fault may be signaled at that point.

Similarly, if the DTLB 256 detects a miss for a translation request (for a load or store data access in the data cache 235), the LSU 230 transmits a TLB reload request to the MMU 250. The MMU 250 may either return a translation for storage in the DTLB 256 (successful table walk) or signal a HW TW miss (unsuccessful table walk). The MMU 250 may signal the HW TW miss directly to the TLU 270, or to the LSU 230, which may associate the HW TW miss with the correct load/store instruction.

Figure 3:
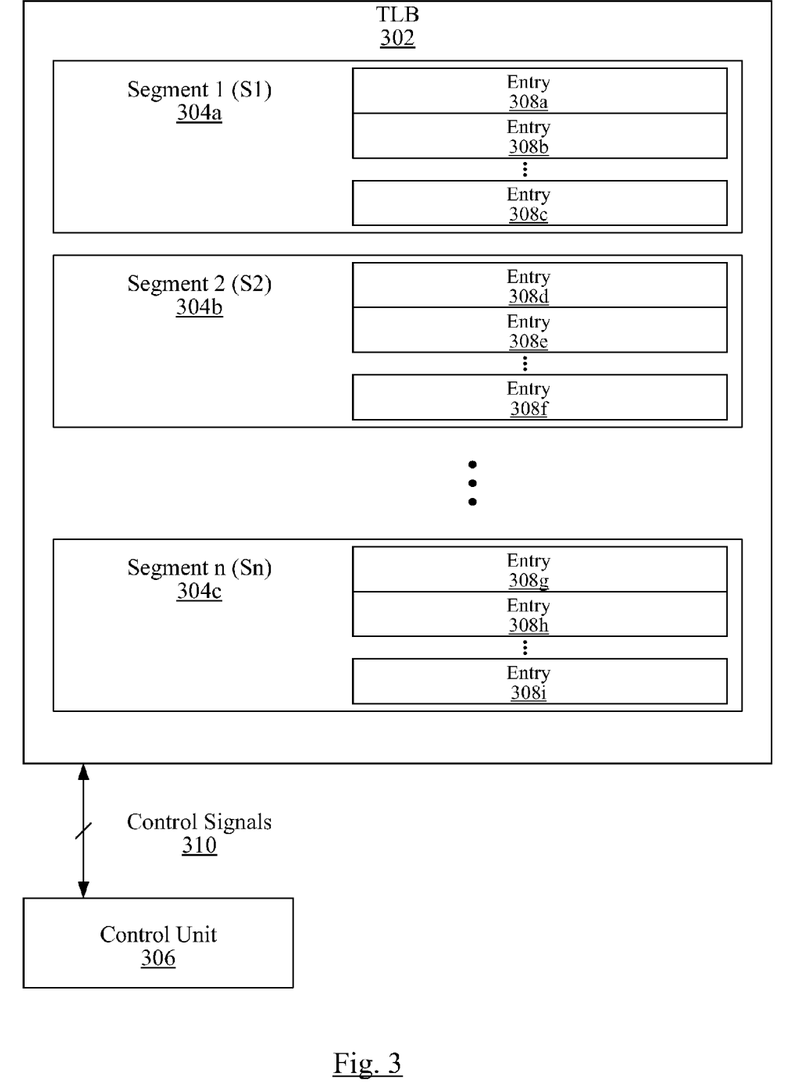
FIG. 3 is a block diagram of one embodiment of a segmented TLB.

Turning now to FIG. 3, one embodiment of a TLB 302 (TLB may refer to either a DTLB, ITLB, or other buffer or cache configured to store address translations) may comprise a plurality of segments 304a-304c. A segment 304 may contain any number of TLB entries 308a-308i, where a TLB entry 308 may contain translation data. In one embodiment, each of the segments may have a fixed uniform size, while in other embodiments the segment may have sizes which vary among the plurality of segments. Additionally, in various embodiments segment sizes may be changed or updated dynamically. In some embodiments, TLB 302 may be physically segmented in various ways with additional logic used to combine the physical segments into a larger structure. In such cases, the segments 304 may correspond to the physical segments. In other embodiments, segments 304 may not corresponds directly to physical segmentation of TLB 302.

In the embodiment of FIG. 3, a control unit 306 is shown coupled to the TLB 302. Control unit 306 may comprise hardware and/or software. Further, control unit 306 may be located within a TLB, or located elsewhere within the processor as desired, such as in the IFU 200 or LSU 230. Embodiments are contemplated in which control unit 306 is configured to determine whether and/or to what degree a TLB segment is being utilized. Additionally, in various embodiments, control unit 306 may be configured to enable or disable segments 304 of the TLB 302 (e.g., via control signals 310). Disabling a segment generally includes reducing or eliminating power to a given segment, and enabling a segment generally includes restoring or otherwise providing power to a segment. Segments which are disabled may be considered "inactive", while segments which are enabled may be considered "active." By selectively enabling fewer than all segments 304, power consumption may be reduced. Additionally, as described in further detail below, enabling and disabling of segments may be performed in such a manner that there is little or no performance loss.

Figure 4:
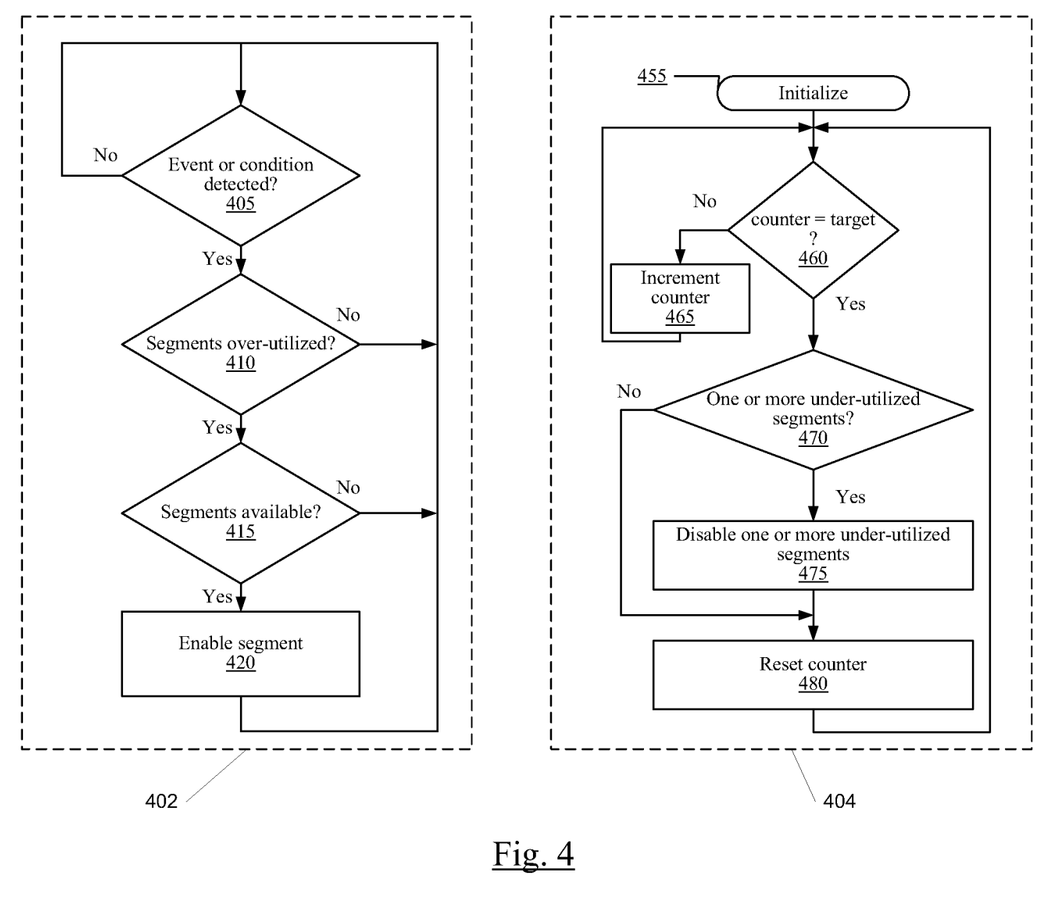
FIG. 4 illustrates one embodiment of a method(s) for operating a TLB.

Turning now to FIG. 4, embodiments of a method(s) for managing or operating a TLB are shown. In the embodiment shown, two blocks/flowcharts (402 and 404) are depicted. In various embodiments, the corresponding methods 402 and 404 may be performed concurrently or otherwise. In one embodiment, method 402 performs various activities in response to detecting an event or condition, while method 404 may perform various activities on a periodic basis.

In method 402, when a condition is detected 405, a determination may be made as to whether one or more currently enabled segments are over-utilized 410. Such a condition or event (405) may, for example, include events that indicate more entries may be needed or desired (e.g., such as a TLB miss). Other events and conditions in which additional segments are needed or desired are possible and are contemplated. If over-utilization of one or more segments is detected, and there are currently disabled segments in the TLB available for activation (decision block 415), a disabled segment may be enabled. If over-utilization is detected but there are no additional segments available for activation, method 402 may simply return to block 405. In some embodiments, a given number of segments may be over-utilized before additional segments are enabled. The given number of segments (e.g., in step 410) may be all of the currently enabled segments, or some number less than all of the currently enabled segments. Additionally, this given number may be fixed or may vary during operation. For example, the given number of segments required before enabling of additional segments is performed may be dynamically determined based on various events or conditions. Further the given number may be programmable.

Block 404 of FIG. 4 illustrates one embodiment of a method for disabling segments based on segment utilization. In some embodiments, such disabling may be performed at periodic intervals. In the embodiment shown, the period is defined by a counter. However, in other embodiments other methods may be used to define a period. Method 404 includes initializing a TLB (block 455) which may include enabling one or more segments and/or configuring the counter. Subsequent to initialization, the counter may be compared to a target value corresponding to a desired period 460. If the counter has not reached the target value, it may be incremented 465 (alternatively, incrementation of the counter may be performed prior to the comparison). Responsive to the counter reaching or exceeding the target value, a determination is made as to whether or not one or more segments of a TLB are under-utilized 470. If one or more segments are determined to be under-utilized, one or more of these under-utilized segments may be disabled (block 475). The counter may then be reset (block 480) and the process may return to block 460.

In some embodiments, active entries may refer to entries that are currently in use in a TLB. In some embodiments, utilization of a segment is based at least in part on how many such entries are active (in use). In some embodiments, the utilization of a TLB segment may correspond to not only the number of entries currently in use, but also the number of entries which have been accessed recently in that segment. In other words, an entry more recently accessed may correspond to a higher segment utilization than an entry which has not been accessed as recently. When performance is a concern, more TLB entries may be made available so that translation data of active entries is not replaced by new translations. As may be appreciated, the number of TLB entries needed may change depending on processor workload. Ideally, a sufficient number of entries are used such that no entry is replaced when it will be used again within a relatively short period of time. Because the same page of memory is often accessed multiple times in a relatively short period, whether or not an entry has been recently accessed may be a good indication of whether an entry is likely to be used again in the near future. In one embodiment, a segment may be considered over-utilized if the number of accesses to entries in the segment meets an upper threshold, and a segment may be considered under-utilized if the number of accesses to entries in the segment meets a lower threshold. The thresholds used may have the same or different values. A value meeting a threshold may mean that a value is greater-than an upper threshold (or less than a lower threshold as appropriate) or greater/less-than-or-equal-to the threshold in various embodiments.

When a segment is deemed under-utilized, there may still be active entries in the segment. In one embodiment, those entries may be lost if the segment is disabled. In other embodiments, those entries may be moved to other segments before the segment is disabled. The segments chosen to receive the moved entries may be determined in any desired manner. For example, the moved entries could be spread across the remaining segments in a relatively even manner. Alternatively, the moved entries from the disabled segments may be moved to segments that are not over-utilized (or have relatively low utilization). Numerous such methods of moving the entries are possible and are contemplated.

In one embodiment, when enabling a segment, the control unit or method may determine which segment to enable by starting from a particular (first) segment and searching forward through the segments until one or more disabled segments are found, or doing nothing if all segments are already enabled. Similarly, identification of a segment to disable may involve searching through the segments beginning with the first segment. In other embodiments, the control unit or method may determine which segments to disable by starting with the last enabled segment, and searching through the segments until one or more under-utilized segments are found, or doing nothing if only one segment is currently enabled. Other methods for efficiently finding enabled, disabled, under-utilized, and over-utilized segments are possible and are contemplated. In some embodiments, the initial state of the TLB (e.g., after a reset or initialization) may be that in which only one segment is enabled.

Figure 5:
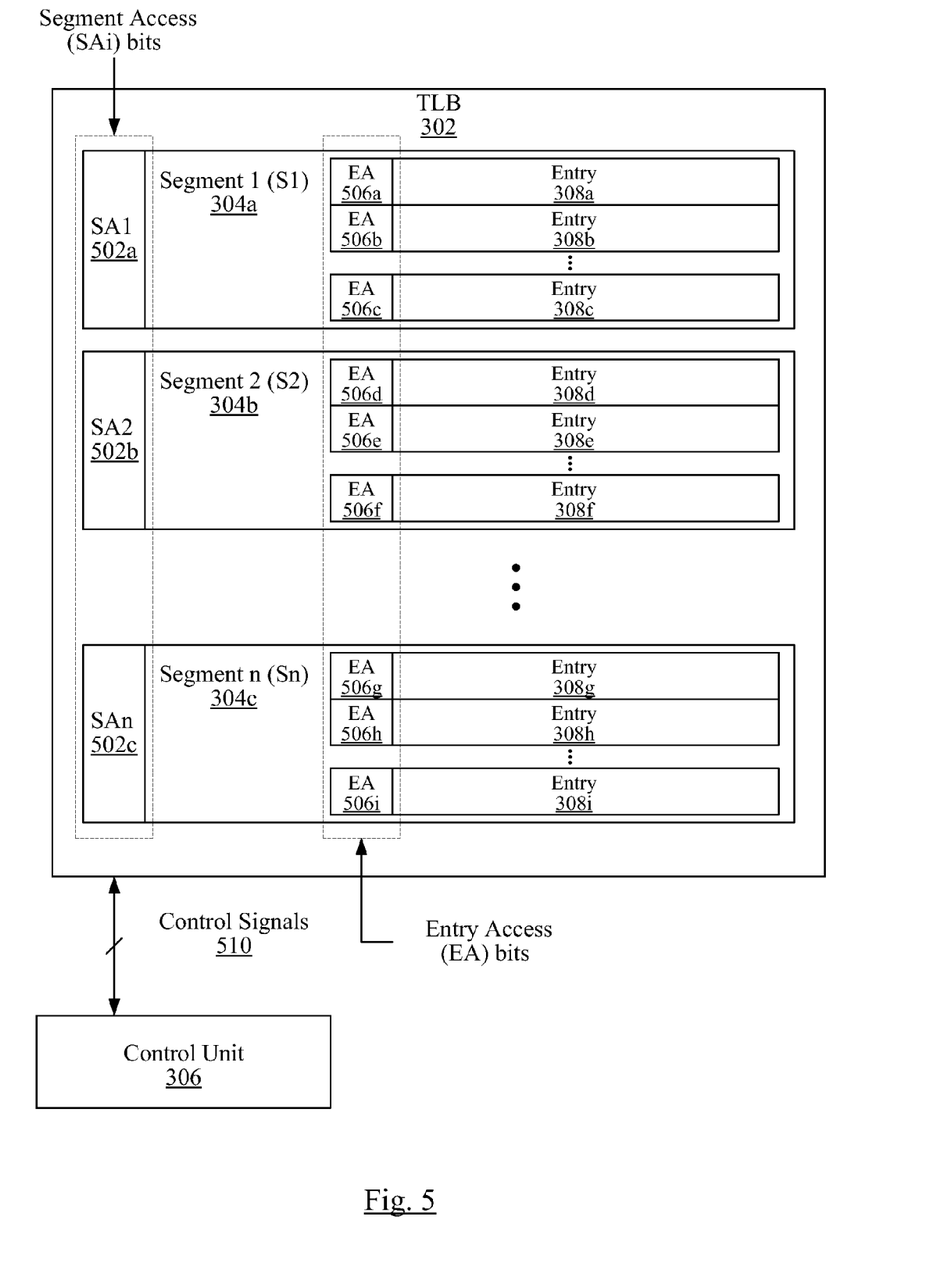
FIG. 5 is a block diagram of an embodiment of a TLB with access bits.

Turning now to FIG. 5, one embodiment of TLB 302 and control unit 306 is shown. In the embodiment shown, utilization of a segment may be indicated (at least in part) using entry access (EA) bits 506a-506i. Each entry 308 in the TLB 302 may comprise an entry access bit 506a-506i corresponding to that entry. In various embodiments, an entry access bit 506 is set when the corresponding entry is loaded with a valid translation. In other embodiments, an entry access bit 506 is set when a valid translation match occurs on the entry responsive to a provided virtual address. Such a match may be referred to as a TLB hit. In an embodiment in which EA bits 506 are set on a TLB hit, the EA bits may be used to indicate TLB entries more recently used (or more actively used) as previously described. As previously discussed, a segment may be considered over-utilized if the number of entry access bits set in the segment meets an upper threshold, and a segment may be considered under-utilized if the number of entry access bits set in the segment meets a lower threshold. As an alternative to, or in addition to, the entry access bits, other methods may be used to track the number of entries being used, or recently accessed. For example, counters may be used to track the number of times entries are accessed. In some embodiments, access bits 506 may also be used as part of a replacement algorithm. For example, access bits 506 may provide an indication as to how recently a particular entry has been used. In such a case, bits 506 may be used as part of a least recently used replacement algorithm. Other algorithm may be used as well. Numerous such alternatives are possible and are contemplated.

In various embodiments, access rates to entries or segments may be determined. For example, accesses within a given period may be determined. In one embodiment, entry access bits (or any other element used to track entry use) are reset or cleared on a periodic basis (or based on some other condition or event). As further illustrated by FIG. 5, each segment may further comprise a segment access (SA) bit 502a-502c that may be used to indicate utilization information from an earlier period. For example, in the embodiments described below, a segment access bit may be set if the number of entry access bits set in the segment meets an upper threshold, and cleared if the number of entry access bits set in the segment meets a lower threshold.

Figure 6:
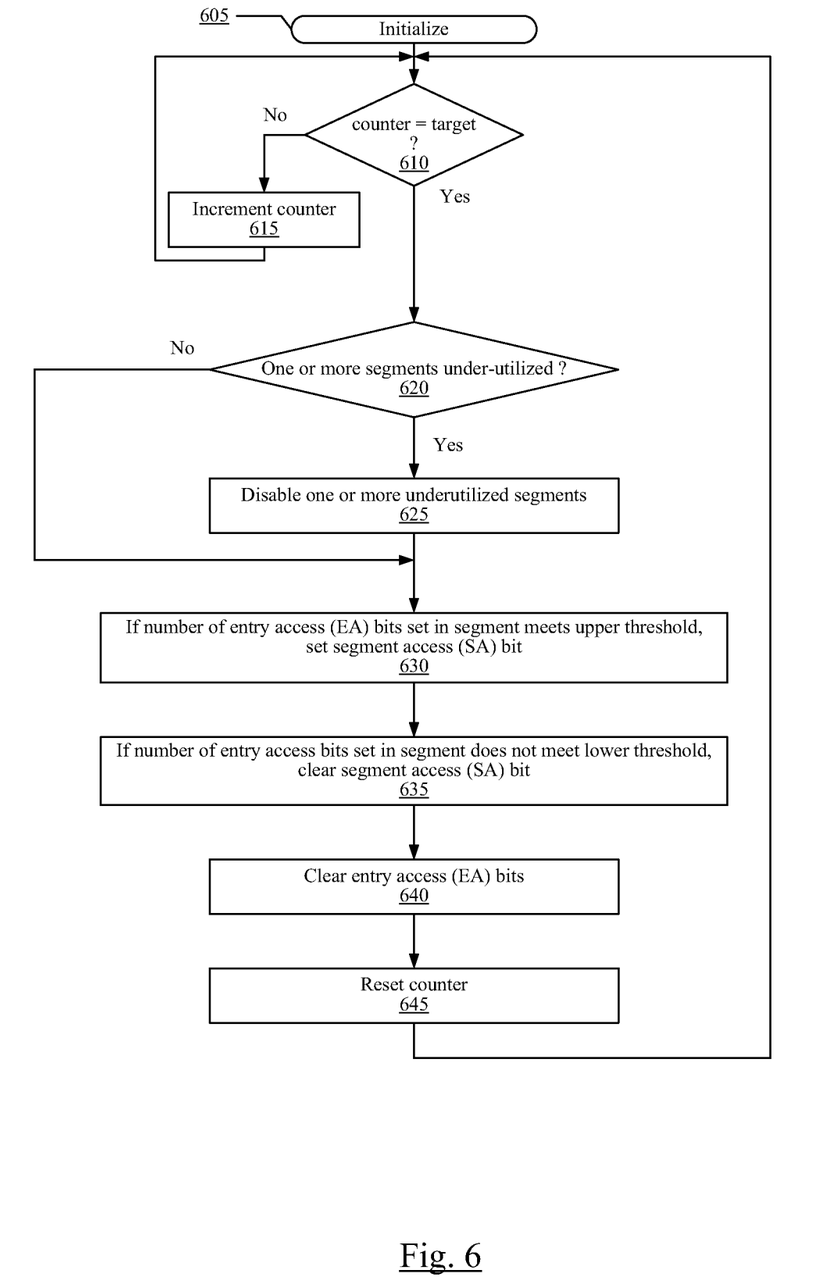
FIG. 6 illustrates one embodiment of method for operating a TLB.

FIG. 6 illustrates one embodiment of a method for managing a TLB. The embodiment of FIG. 6 is similar to that shown in FIG. 4. However, in FIG. 6, accesses within a given period of time (or alternatively number of events) are determined. In FIG. 6, a determination is made as to whether a given period of time has elapsed. In the example shown, the count of a counter is compared to some value/target (decision block 610). If the count is not equal to the target, then the counter may simply be incremented and the method returns to block 610. On the other hand, if the desired period of time has elapsed, then a determination is made as to whether one or more segments are under-utilized (decision block 620). If under-utilization of segments is detected, then one or more of the under-utilized segments may be disabled (block 625) and the method may proceed with block 630. If no under-utilization is detected, then the method may bypass block 625 to block 630.

In the method of FIG. 6, if the number of set entry access (EA) bits in a segment meets a given (upper) threshold, then the corresponding segment (SA) bit may be set (block 630). In various embodiments, all segments (or all currently enabled segments) may be checked for such a condition. Additionally, if the number of EA bits set in a given segment falls below some threshold then the corresponding SA bit may be cleared (block 635). Finally, the EA bits may be cleared (block 640) and the counter reset (block 645). In this manner, the actions depicted in blocks 620-645 may be performed on a periodic (or according to some number of events) basis. As can be seen, in some cases, the SA bits are not cleared (i.e., the condition in block 635 is not met). This carry-over of the SA bit from a previous period may be used because a segment can be over-utilized, but still appear to be under-utilized based on the entry access bits just after all the entry access bits are cleared. A set segment access bit for such a segment may indicate that the segment was previously over-utilized even though the entry access bits in the most recent period did not meet an upper threshold. Other methods for ensuring that utilization tracking is accurate and recent may be used in other embodiments. For example, timestamps or cycle counters may be used to track when entries were loaded or accessed. In various embodiments, the period indicated in FIG. 6 may be fixed, variable, and/or may be dynamically determined.

In embodiment utilizing EA bits and SA bits, the period or time interval should be sufficiently long such that a segment's access bits (i.e. the combination of segment access bits and entry access bits in the segment) do not indicate that a segment is under-utilized when its entries are actually needed. Should needed segments be disabled, loss of performance (more TLB misses) may result. In other words, if the time period is too short, the access bits may not provide a reliable indication of usage. Conversely, if the time period is too long, all segments may appear over-utilized and remain enabled. This in turn may result in unnecessary power consumption.

Figure 7:
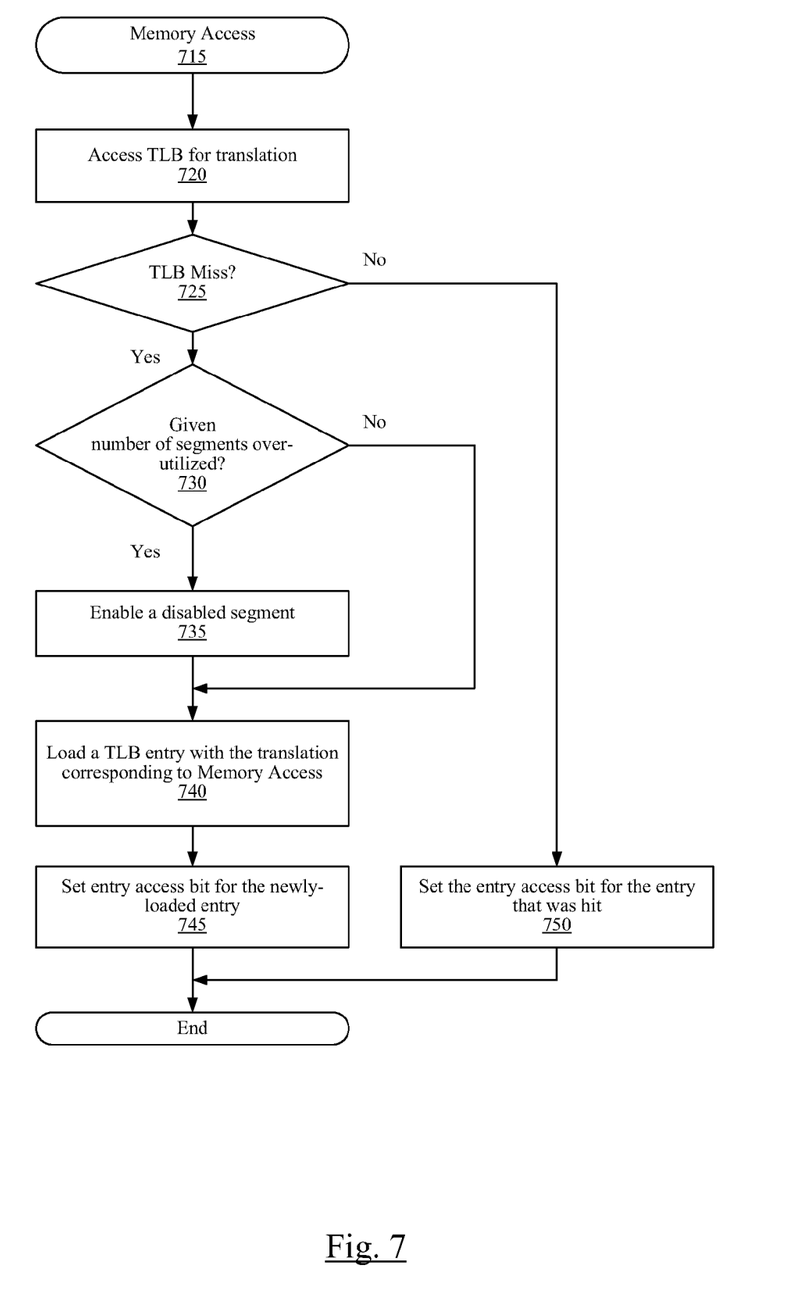
FIG. 7 illustrates one embodiment of a method for operating a TLB.

Turning now to FIG. 7, one embodiment of a method for managing a TLB is shown. Responsive to a memory access 715, a TLB is accessed 720 to determine if a corresponding translation is available. If the TLB contains a matching entry (a TLB hit), the EA bit corresponding to the entry may be set (block 750). On the other hand, if the TLB does not contain an entry with the needed translation (a TLB miss 725), a determination is made as to whether a given number of segments are over-utilized 730. Should one or more segments be over-utilized, then a currently disabled segment may be enabled (block 735). Additionally, a translation corresponding to the memory access may be loaded 740 into a TLB entry, and an entry access bit corresponding to that entry may be set 745.

Figure 8:
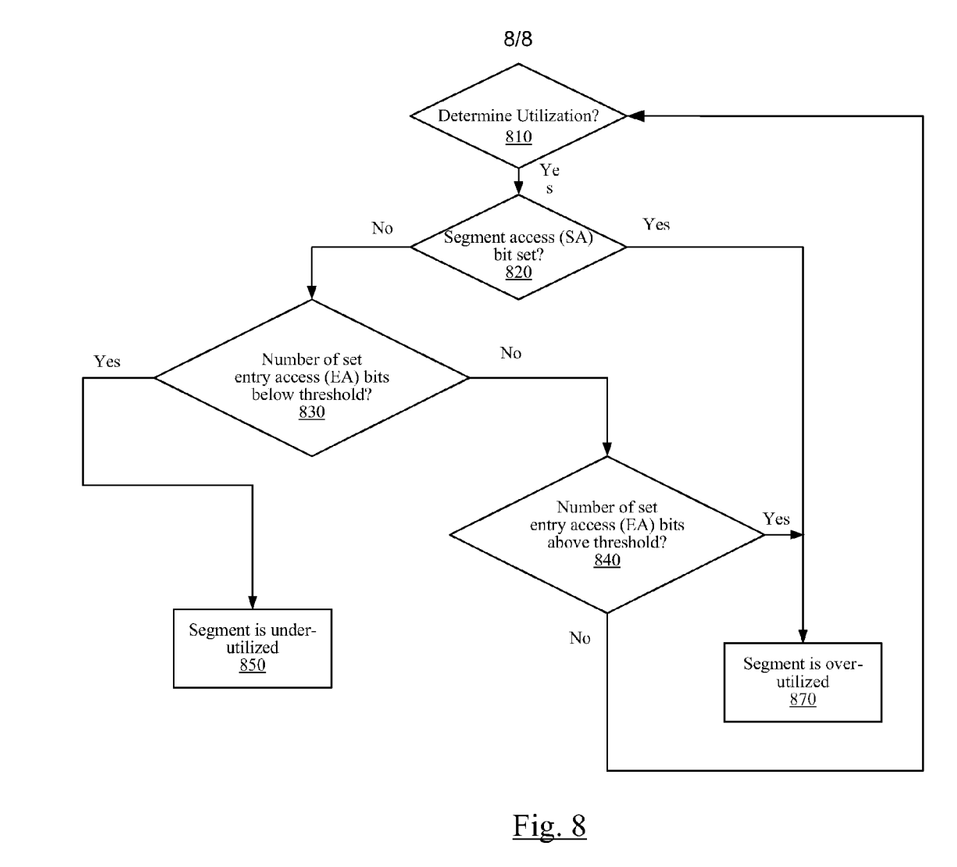
FIG. 8 is a flowchart illustrating operation of one embodiment of a control unit determining utilization of a segment.

Turning now to FIG. 8, in various embodiments, the utilization of a segment may be determined based at least in part on both the segment access (SA) bit and entry access (EA) bits. In response to a request for the utilization information for a segment (block 810), the segment access bit(s) of a segment is checked 820. It is noted that in various embodiments the request for utilization information may not be represented by an explicit request. Rather, this request may simply correspond to action taken in response to a particular event, condition, expiration of a time period, or otherwise. If the segment access bit is set (decision block 820), the segment may be deemed over-utilized (block 870). If the segment access bit is not set, and the number of access bits set in the segment meets a lower threshold (block 830), the segment may be deemed under-utilized (block 850). If the segment access bit is not set, but the number of entry access bits set in the segment meets an upper threshold (decision block 840), the segment may be deemed over-utilized 870. Otherwise, a segment may be deemed neither under-utilized nor over-utilized.

The upper threshold used to determine over-utilization and the lower threshold used to determine under-utilization may be determined by those skilled in the art to improve performance and/or power consumption. In other embodiments, additional thresholds and additional utilization states may be used to determine utilization information. For example, in some embodiment, utilization thresholds may be based on a percentage of the entries within the segment. The utilization thresholds may comprise other measurements related to attributes of the entries in a segment.

In other illustrative embodiments, a computer readable storage medium storing program instructions is provided. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. The program instructions, when executed by a computing device, cause the computing device to perform various combinations of the operations outlined above with regard to the illustrated embodiments. Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations. Additionally, while the methods described herein may discuss or depict particular events or actions being taken in a particular order, in various embodiments the order may be other than discussed or depicted. Further, in some embodiments various actions may be performed concurrently.

Numerous variations and modifications will become apparent to those skilled in the art once the above disclosure is fully appreciated. It is intended that the following claims be interpreted to embrace all such variations and modifications.

What is claimed is:

1. A processor, comprising:
   a translation lookaside buffer (TLB) comprising a plurality of segments, wherein each segment includes one or more entries; and
   a control unit coupled to the TLB, wherein the control unit is configured to:
      disable an enabled segment in response to determining that the segment is under-utilized; and
      enable a disabled segment in response to determining that a given number of currently-enabled segments are over-utilized;
   wherein each TLB entry of the one or more entries comprises a corresponding entry access bit; and
   wherein each segment of the plurality of segments further comprises a corresponding segment access bit.

2. The processor of claim 1,
   wherein the control unit is configured to:
      determine a particular segment of the plurality of segments is over-utilized, in response to determining a number of active entries in the particular segment meets an upper threshold; and
      determine the particular segment of the plurality of segments is under-utilized, in response to determining the number of active entries in the particular segment meets a lower threshold.

3. The processor of claim 1, wherein the control unit is further configured to enable a disabled segment in response to detecting an event or condition.

4. The processor of claim 3, wherein the event comprises a TLB miss.

5. The processor of claim 1 wherein the control unit is configured to set an entry access bit of a given entry responsive to at least one of: when the entry is loaded with a translation, and when there is a valid translation match on the entry.

6. The processor of claim 1, wherein the control unit is further configured to periodically:
   set a segment access bit of a first segment if a number of set entry access bits corresponding to the first segment meets an upper threshold;
   clear the segment access bit if the number of set entry access bits meets a lower threshold; and
   clear all entry access bits.

7. The processor of claim 6, wherein
   a particular segment is considered over-utilized if an access bit corresponding to the particular segment is set or a number of set entry access bits corresponding to the particular segment meets an upper threshold; and
   a particular segment is considered under-utilized if the access bit corresponding to the particular segment is not set and the number of set entry access bits corresponding to the particular segment meets a lower threshold.

8. A non-transitory computer readable storage medium comprising instructions, wherein the instructions are executable by a processor to:
   access a translation lookaside buffer (TLB) comprising a plurality of segments, wherein each segment includes one or more entries;
   disable an enabled segment in response to determining that the segment is under-utilized; and
   enable a disabled segment in response to determining that a given number of currently-enabled segments are over-utilized;
   wherein each TLB entry of the one or more entries comprises a corresponding entry access bit; and
   wherein each segment of the plurality of segments further comprises a corresponding segment access bit.

9. The non-transitory storage medium of claim 8, wherein the instructions are further executable by a processor to:
- determine a particular segment of the plurality of segments is over-utilized, in response to determining a number of active entries in the particular segment meets an upper threshold; and
- determine the particular segment of the plurality of segments is under-utilized, in response to determining the number of active entries in the particular segment meets a lower threshold.

10. The non-transitory storage medium of claim 8, wherein the instructions are further executable by a processor to enable a disabled segment in response to detecting an event or condition.

11. The non-transitory storage medium of claim 10, wherein the event comprises a TLB miss.

12. The non-transitory storage medium of claim 8, wherein an entry access bit is set responsive to at least one of: when an entry is loaded with a translation, and when there is a valid translation match to an entry.

13. The non-transitory storage medium of claim 8, wherein the instructions are further executable by a processor to:
- set a segment access bit of a first segment if a number of set entry access bits corresponding to the first segment meets an upper threshold;
- clear the segment access bit if the number of set entry access bits meets a lower threshold; and
- clear all entry access bits.

14. The non-transitory storage medium of claim 13, wherein
- a particular segment is considered over-utilized if an access bit corresponding to the particular segment is set or a number of set entry access bits corresponding to the particular segment meets an upper threshold; and
- a particular segment is considered under-utilized if the access bit corresponding to the particular segment is not set and the number of set entry access bits corresponding to the particular segment meets a lower threshold.

15. A method for managing a translation lookaside buffer (TLB), the method comprising:
- accessing a translation lookaside buffer (TLB) comprising a plurality of segments, wherein each segment includes one or more entries;
- disabling an enabled segment in response to determining that the segment is under-utilized; and
- enabling a disabled segment in response to determining that a given number of currently-enabled segments are over-utilized;
- wherein each TLB entry of the one or more entries comprises a corresponding entry access bit; and
- wherein each segment of the plurality of segments further comprises a corresponding segment access bit.

16. The method of claim 15, further comprising:
- determining a particular segment of the plurality of segments is over-utilized if a number of active entries in the particular segment meets an upper threshold; and
- determining a particular segment of the plurality of segments is under-utilized if a number of active entries in the particular segment meets a lower threshold.

17. The method of claim 15, further comprising enabling a disabled segment in further response to detecting an event or condition.

18. The method of claim 17, wherein the event comprises a TLB miss.

\* \* \* \* \*